Feb. 5, 1935.　　　E. KINSELLA ET AL　　　1,990,078
EXTRUSION APPARATUS
Filed Oct. 27, 1933
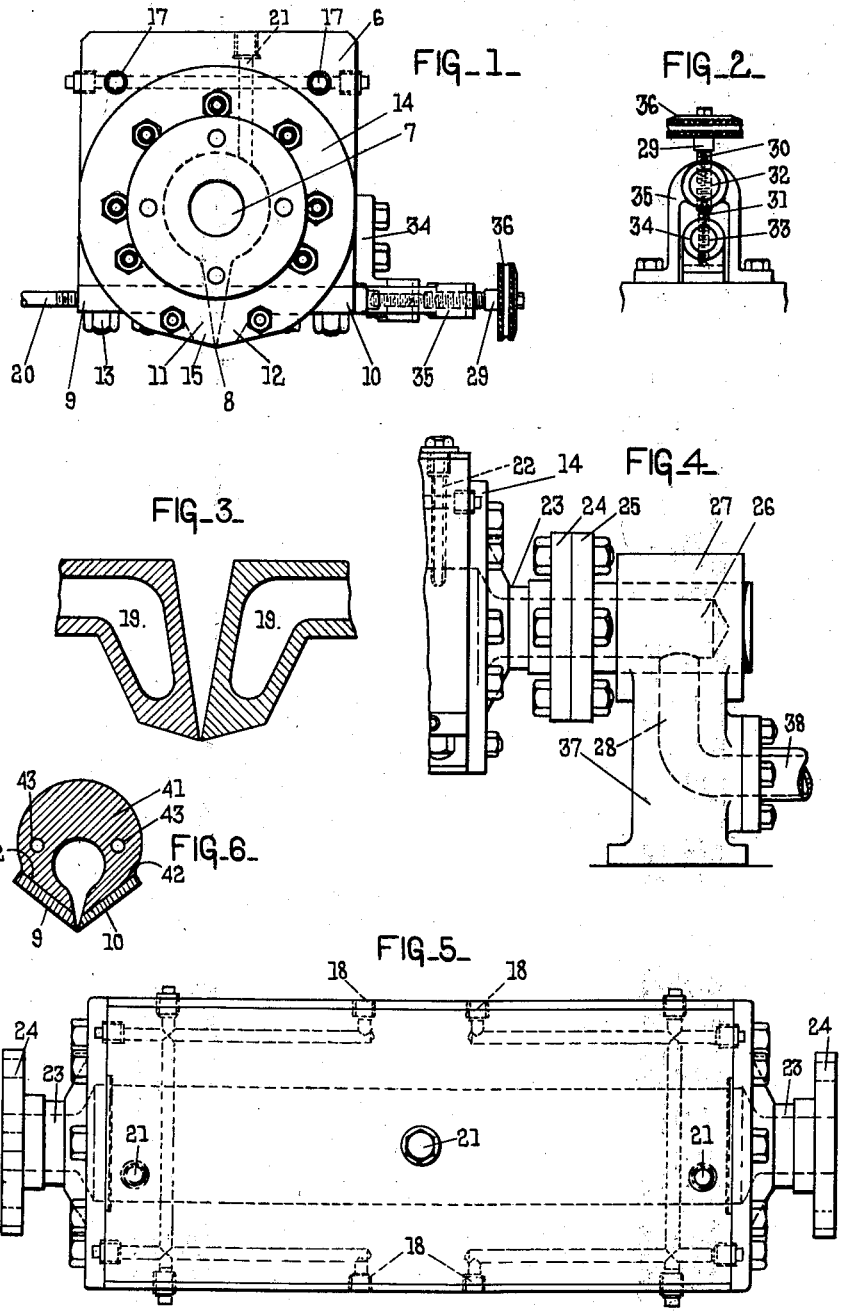

Patented Feb. 5, 1935

1,990,078

UNITED STATES PATENT OFFICE 1,990,078

EXTRUSION APPARATUS

Edward Kinsella and Robert Jabez Ward, Spondon, near Derby, England, assignors to Celanese Corporation of America, a corporation of Delaware Application October 27, 1933, Serial No. 695,391
In Great Britain November 10, 1932

5 Claims. (Cl. 18—15)

This invention relates to extrusion apparatus, and in particular to nozzles suitable for the extrusion of materials into thin sheets or films, especially films of great thinness such as are used for packing materials.

In the extrusion of such materials it is particularly important to ensure an even rate of discharge of the material over the whole length of the slit through which the solution or plastic material passes in order that the resultant sheet or film may be of uniform thickness throughout its width, or at any rate over its whole width with the exception of a narrow band at each edge, and also to impart a regular surface to the material. Consequently, as regards the extrusion apparatus two factors are of paramount importance, (a) that under working conditions the width of the slit should be uniform along its whole length, and (b) that the material to be extruded should be fed at a rate which is uniform over the whole length of the slit.

In the case of films intended for packing or wrapping purposes, the thickness of the films employed is very small, varying from 0.002 inch down to 0.0012, 0.0008, 0.0005 inch or less, and in consequence the dimensions of the slit cannot be permitted to vary by more than very small fractions of an inch, and great care has to be taken in the manufacture of the extrusion nozzle. Thus, the width of the slit must be made accurate to within very small margins of error of the order of less than 0.0001 inch, while the interior surface of the slit must be made very smooth.

It is, however, of great advantage in the manufacture of such materials to deliver a plastic material or solution to the slit under pressure. For example, where the material is in the form of a plastic mass, its viscosity may be such as to require high pressures to produce extrusion, while when the material is in the form of a solution, benefits may be obtained (e. g. a reduction in the amount of solvent to be removed and recovered), by using solutions of high concentration, and consequently high viscosity, and fairly high pressure is necessary to force such solutions through the orifice. Under such conditions the pressure applied to cause the solution to pass through the orifice acts transversely on the two walls of the orifice, and tends to force them apart, and it is found in practice that considerable deflection results from this pressure, thus varying the width of the orifice, and consequently the thickness of the extruded material.

The principal object of the present invention is to provide an extrusion apparatus in which this tendency to deflection is overcome, or at any rate reduced to such an extent that the extruded product is substantially uniform in thickness.

According to the invention the extrusion apparatus comprises a solid body or block of material in which or on which is formed the extrusion slit proper, the body or block being formed with an internal longitudinal passage running over the length of the extrusion slit, and formed eccentrically in the block so that there is a generally increasing thickness of material from the side of the passage communicating with the slit to the side of the passage remote from the slit. Thus, the block may be considered as two members integrally connected at a point opposite to the slit, and increasing in thickness from the neighbourhood of the slit round to the connecting point, so that there is a much greater thickness of material at the connecting point than at the slit. Each member therefore constitutes a cantilever, fixed to the other member at its root, and free at the tip past which flows the material to be extruded, the material of the block being properly disposed to provide a maximum resistance to bending under the pressure applied internally.

The interior passage is of large cross-section, so that the kinetic energy of the material applied thereto under pressure is almost entirely transformed into pressure energy, and the material then under uniform pressure throughout the passage passes uniformly to the extrusion orifice.

Such a block as is above described may be of roughly circular cross-section, or, conveniently, of square cross-section, the extra material at the corners in the latter case contributing but little to the strength of the cantilevers referred to above, but facilitating the construction of the apparatus, and the fitting and adjustment of the extrusion slit proper. Where a square block is employed, the face of the block in which the slit is disposed provides solid supports for a pair of plates having their adjacent edges almost meeting to leave a gap of required width for the passage of the extruded material. Conveniently the block is cut away immediately behind the slit formed by the two plates so as to form a chamber of small cross-section by which the material is fed from the interior passage to the slit. The opposed faces or jaws of the two plates may be so bevelled as to form a converging passage from this longitudinal chamber to the slit proper.

The width of the slit may be adjusted by sliding the plates, e. g. by means of micrometer screws, on the faces of the block to which they are secured, the plates being accurately guided and supported on the block, and their operative faces carefully machined and finished so that the two walls of the slit are parallel to each other.

The block of square cross-section above described is convenient in affording a simple and rigid support for the plates forming the extrusion orifice and in permitting adjustment of the plates to be easily effected without disturbing the rigidity afforded.

Passages for heating or cooling fluid may be formed in the material of the block. For example, in the case of the square section block, space is offered for these passages in the corners of the block not occupied by the interior passage. In the case of the roughly circular block, such passages may be formed on the mid-section of the material constituting each cantilever so as not materially to disturb the strength of these members. The block may have a uniform cross-section throughout its length, although, if desired, the extrusion slit may be so formed that, when not under pressure, it has a slightly smaller width at its mid point than at its ends, to compensate for any difference in expansion between the middle and the ends of the orifice when under pressure. The orifice plates should be secured to the block at very frequent intervals.

The nozzle according to the invention achieves great uniformity in the delivery of the material over the width of the slit, and by accurate control over the amount of material fed to the extrusion apparatus, sheets or films having great uniformity over their length as well as over their width may be obtained.

It is desirable to employ a pump to force the material to the slit, especially where materials of high or very high viscosity are to be employed, and in order to ensure close uniformity in the rate of flow of material, especially over long periods, the pumping means may be provided with control devices to maintain the output constant. Preferably gear pumps are employed for delivering materials under pressure, since such pumps have themselves a high degree of uniformity of output, and are very little subject to wear. Suitable control means for the pressure pumps are described in U. S. Patents Nos. 1,477,850 and 1,834,737, according to which the pressure on the two sides of a measuring pump working at a steady rate are maintained equal under the control of pressure balance valves, so maintaining the output of the pump uniform. A filter may be arranged between the pump or other pressure means to free the solution from matter likely to reduce the quality of the extruded material.

The apparatus according to the invention may be employed for the extrusion of material either into a coagulating bath, or into an evaporative atmosphere. For example, it may be used for the extrusion of viscose or cuprammonium solutions, in which case materials should be used which resist corrosion by the solutions, or solutions of cellulose acetate or other cellulose derivatives into coagulating baths. Again, it may be used for the extrusion of plastic materials containing pyroxylin, cellulose acetate, or other cellulose derivatives with or without pigments, fillers, plastifiers, or the like either into an evaporative atmosphere or into a setting bath, or for the extrusion of solutions of cellulose acetate or other cellulose derivatives, for example organic cellulose derivatives such as cellulose esters, e. g. cellulose acetate, formate or propionate, or cellulose ethers, e. g. ethyl, methyl and benzyl cellulose, into an evaporative atmosphere.

Extrusion may take place on to drums or bands having a metallic or other smooth surface, e. g. a polished metal band as described in U. S. application S. No. 651,159 filed 11th January, 1933 or as described in U. S. applications S. Nos. 666,655 and 666,656 filed 18th April, 1933, extrusion may be effected into a coagulating bath some distance from a drum or other support which receives the material after initial coagulation.

By way of example one form of apparatus according to the invention will be described in greater detail with reference to the accompanying drawing in which:—

Figure 1 is an end elevation of the extrusion apparatus according to the invention;

Figures 2 and 3 show details of Figure 1;

Figure 4 is a side elevation of one end of the apparatus shown in Figure 1,

Figure 5 is a plan view of the apparatus shown in Figure 1, and

Figure 6 is a diagrammatic sectional end elevation of a modification of the apparatus shown in Figure 1.

The apparatus consists of a block 6 longitudinally of which is bored an interior passage 7. The passage 7 is eccentrically disposed in the block 6 so that a very much greater thickness of material lies over the passage 7 than under it. The passage 7 communicates on its under side with the extrusion slit 8 which is formed between the two plates 9, 10 having suitably shaped jaws 11, 12. The plates 9, 10 are carried on the under face of the block 6 by means of nuts 13.

The interior passage 7 is closed by means of a circular end plate 14 suitably shaped at 15 to form a termination for the extrusion slit 8. The width of the extrusion slit 8 is adjusted by sliding the plate 10 horizontally. This is effected by means of the micrometer screw 29, shown also in Figure 2. The screw 29 is in two parts 30, 31 which are of the same hand but of slightly different pitch. The parts 30, 31 pass through trunnions 32, 33 carried in brackets 34, 35 which are disposed on the block 6 and the plate 10 respectively. By rotating the screw 29 by means of the milled head 36 a very fine adjustment of the width of the slit 8 may be obtained by reason of the differential action of the two parts 30, 31 of the screw 29. Heating passages 17 are provided in the block 6 and are fed with a heating medium by means of suitable openings 18. In addition, the plates 9, 10 and the jaws 11, 12 may be provided with cavities 19, illustrated in Figure 3, fed with a heating fluid as by means of pipes 20.

Thermometer pockets 21 may be provided communicating with the interior passage 7, the pockets 21 being lined with a strong pressure-resistant lining 22, adapted for the reception of a thermometer.

The block 6 is supported by means of trunnions 23 integral with the said end plates 14, and the interior passage 7 is provided with the material to be extruded through these trunnions. Thus the trunnion 23 is flanged at 24, the flange 24 being secured to another flange 25 on a hollow trunnion 26 carried in a fluid-tight bearing 27. The interior of the trunnion 26 communicates with the passage 28 in the pedestal 37 of the bearing 27. Spinning solution is fed to the passage 28 by means of the pipe 38 and so through the trunnions 26, 23 to the interior passage 7. Feeding may be effected simultaneously from both ends of the block in this manner, an arrangement which is of particular advantage when the solution to be extruded is of a highly viscous nature. With less viscous solution, feeding may, if desired, be effected from one end only.

In Figure 6 a modified form of the apparatus is shown, in which a block 41 of roughly circular cross-section is employed, flats 42 being worked on the block for the support of plates 9 and 10. Passages 43 for heating fluid are provided. This form of block has substantially all the strength of the block previously illustrated, and is more economical in material, though somewhat more expensive in construction.

What we claim and desire to secure by Letters Patent is:—

1. Apparatus for the extrusion of sheets, films, foils and the like, said extrusion apparatus comprising a solid body of material on which is formed an extrusion slit, the body being formed with an internal longitudinal passage running the length of said extrusion slit and communicating therewith, and disposed eccentrically in the body so that there is a generally increasing thickness of material from the side of said passage communicating with said slit to the side of said passage remote from said slit.

2. Apparatus for the extrusion of sheets, films, foils and the like, said extrusion apparatus comprising a solid body of material, a pair of plate-like members secured on said body and having jaws adapted to form an extrusion slit, said body being formed with an internal longitudinal passage running the length of said extrusion slit and communicating therewith, and disposed eccentrically in the body so that there is a generally increasing thickness of material from the side of said passage communicating with said slit to the side of said passage remote from said slit.

3. Apparatus for the extrusion of sheets, films, foils and the like, said extrusion apparatus comprising a solid body of material on which is formed an extrusion slit, the body being formed with an internal longitudinal passage running the length of said extrusion slit and communicating therewith, and disposed eccentrically in the body so that there is a generally increasing thickness of material from the side of said passage communicating with said slit to the side of said passage remote from said slit, and passages in said body for the reception of heating medium.

4. Apparatus for the extrusion of sheets, films, foils and the like, said extrusion apparatus comprising a solid body of material, a pair of plate-like members secured on said body and having jaws adapted to form an extrusion slit, said body being formed with an internal longitudinal passage running the length of said extrusion slit and communicating therewith, and disposed eccentrically in the body so that there is a generally increasing thickness of material from the side of said passage communicating with said slit to the side of said passage remote from said slit, and passages in said body and in said jaws for the reception of a heating medium.

5. Apparatus for the extrusion of sheets, films, foils and the like, said extrusion apparatus comprising a solid body of material a pair of plate-like members secured on said body and having jaws adapted to form an extrusion slit, said body being formed with an internal longitudinal passage running the length of said extrusion slit and communicating therewith, and formed eccentrically in the body so that there is a generally increasing thickness of material from the side of said passage communicating with said slit to the side of said passage remote from said slit, and differential screw mechanism in connection with at least one of said plate-like members for the adjustment of the width of said extrusion slit.

EDWARD KINSELLA.
ROBERT JABEZ WARD.